US009773039B2

(12) United States Patent
Knight et al.

(10) Patent No.: US 9,773,039 B2
(45) Date of Patent: Sep. 26, 2017

(54) COMPUTER-IMPLEMENTED SYSTEM AND METHOD FOR IDENTIFYING NEAR DUPLICATE DOCUMENTS

(71) Applicant: FTI Consulting, Inc., Annapolis, MD (US)

(72) Inventors: William C. Knight, Bainbridge Island, WA (US); Steve Antoch, North Bend, WA (US); Sean M. McNee, Seattle, WA (US)

(73) Assignee: FTI Consulting, Inc., Annapolis, MD (US)

( * ) Notice: Subject to any disclaimer, the term of this patent is extended or adjusted under 35 U.S.C. 154(b) by 239 days.

(21) Appl. No.: 14/027,141

(22) Filed: Sep. 13, 2013

(65) Prior Publication Data

US 2014/0082006 A1 Mar. 20, 2014

Related U.S. Application Data

(60) Provisional application No. 61/701,538, filed on Sep. 14, 2012.

(51) Int. Cl.
*G06F 7/00* (2006.01)
*G06F 17/30* (2006.01)

(52) U.S. Cl.
CPC .. *G06F 17/30386* (2013.01); *G06F 17/30628* (2013.01)

(58) Field of Classification Search
None
See application file for complete search history.

(56) References Cited

U.S. PATENT DOCUMENTS

| | | | | |
|---|---|---|---|---|
| 6,240,409 | B1 * | 5/2001 | Aiken | |
| 6,324,555 | B1 * | 11/2001 | Sites | G06F 17/21 707/E17.008 |
| 6,493,709 | B1 * | 12/2002 | Aiken | |
| 6,658,626 | B1 * | 12/2003 | Aiken | 715/205 |
| 7,574,409 | B2 | 8/2009 | Patinkin | |
| 8,001,464 | B1 * | 8/2011 | Goel et al. | 715/234 |
| 2012/0093421 | A1 * | 4/2012 | Kletter | G06K 9/00483 382/209 |
| 2012/0209853 | A1 * | 8/2012 | Desai et al. | 707/741 |

* cited by examiner

*Primary Examiner* — Uyen Le
(74) *Attorney, Agent, or Firm* — Patrick J. S. Inouye; Krista A. Wittman

(57) ABSTRACT

A computer-implemented system and method for identifying near duplicate documents is provided. A set of documents is obtained and each document is divided into segments. Each of the segments is hashed. A segment identification and sequence order is assigned to each of the hashed segments. The sequence order is based on an order in which the segments occur in one such document. The segments are compared based on the segment identification and those documents with at least two matching segments are identified. The sequence orders of the matching segments are compared and based on the comparison, a determination is made that the identified documents share a relative sequence of the matching segments. The identified documents are designated as near duplicate documents.

19 Claims, 7 Drawing Sheets

| Document A Incorrect Text | Hash (A) | | Document B Corrected Text | Hash (B) |
|---|---|---|---|---|
| the quick brown | 111111 | | the quick brown | 111111 |
| quick brown fox | 222222 | | quick brown fox | 222222 |
| brown fox jumped | 333333 | | brown fox jumped | 333333 |
| fox jumped over | 444444 | | fox jumped over | 444444 |
| jumped over the | 555555 | | jumped over the | 555555 |
| over the lazy | 666666 | | over the lazy | 666666 |
| the lazy red | 777777 | | the lazy red | 777777 |
| lazy red odg | 828282 | | lazy red dog | 828282 |
| red odg | 919191 | | red dog | 999999 |
| odg | A0A0A0 | | dog | AAAAAA |

| Document A Incorrect Text | Hash (A) | | Document B Corrected Text | Hash (B) |
|---|---|---|---|---|
| the quick brown | 111111 | | the quick brown | 111111 |
| quick brown fox | 222222 | | quick brown fox | 222222 |
| brown fox jumped | 333333 | | brown fox jumped | 333333 |
| fox jumped over | 444444 | | fox jumped over | 444444 |
| jumped over the | 555555 | | jumped over the | 555555 |
| over the lazy | 666666 | | over the lazy | 666666 |
| the lazy red | 777777 | | the lazy red | 777777 |
| lazy red odg | 828282 | | lazy red dog | 828282 |
| red odg | 919191 | | red dog | 999999 |
| odg | A0A0A0 | | dog | AAAAAA |

Figure 10:
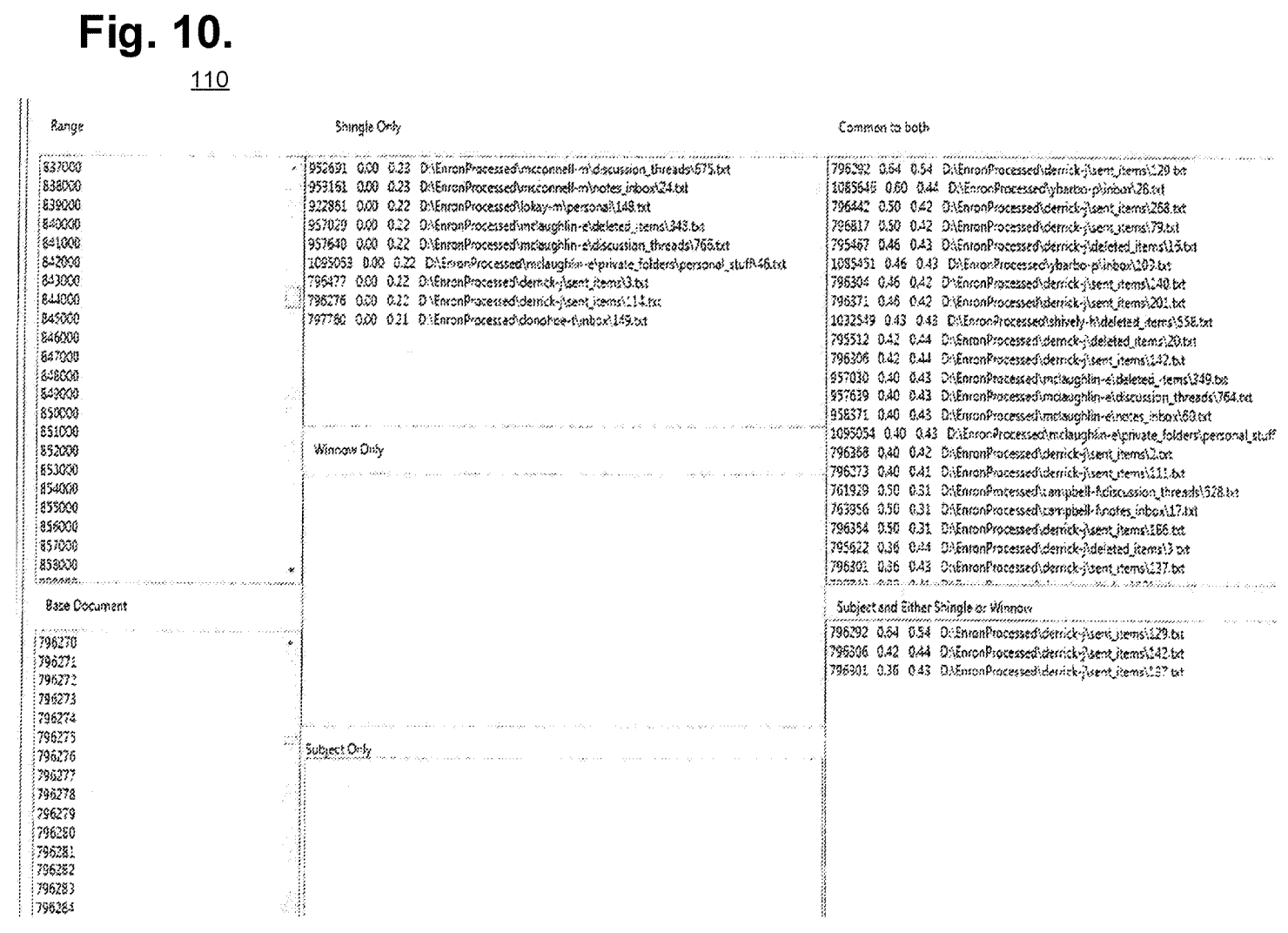

Range 837000
838000
839000
840000
841000
842000
843000
844000
845000
846000
847000
848000
849000
850000
851000
852000
853000
854000
855000
856000
857000
858000

Base Document 796270
796271
796272
796273
796274
796275
796276
796277
796278
796279
796280
796281
796282
796283
796284

Shingle Only 952691 0.00 0.23 D:\EnronProcessed\mcconnell-m\discussion_threads\575.txt
953161 0.00 0.23 D:\EnronProcessed\mcconnell-m\notes_inbox\24.txt
922861 0.00 0.22 D:\EnronProcessed\lokay-m\personal\148.txt
957029 0.00 0.22 D:\EnronProcessed\mclaughlin-e\deleted_items\348.txt
957640 0.00 0.22 D:\EnronProcessed\mclaughlin-e\discussion_threads\766.txt
1095053 0.00 0.22 D:\EnronProcessed\mclaughlin-e\private_folders\personal_stuff\46.txt
796477 0.00 0.22 D:\EnronProcessed\derrick-j\sent_items\3.txt
796276 0.00 0.22 D:\EnronProcessed\derrick-j\sent_items\114.txt
797780 0.00 0.21 D:\EnronProcessed\donohoe-t\inbox\149.txt Winnow Only Subject Only Common to both 796292 0.64 0.54 D:\EnronProcessed\derrick-j\sent_items\129.txt
1085646 0.60 0.44 D:\EnronProcessed\ybarbo-p\inbox\26.txt
796442 0.50 0.42 D:\EnronProcessed\derrick-j\sent_items\258.txt
796817 0.50 0.42 D:\EnronProcessed\derrick-j\sent_items\79.txt
795467 0.46 0.43 D:\EnronProcessed\derrick-j\deleted_items\15.txt
1085451 0.46 0.43 D:\EnronProcessed\ybarbo-p\inbox\209.txt
796304 0.46 0.42 D:\EnronProcessed\derrick-j\sent_items\140.txt
796371 0.46 0.42 D:\EnronProcessed\derrick-j\sent_items\201.txt
1032549 0.43 0.43 D:\EnronProcessed\shively-h\deleted_items\558.txt
795512 0.42 0.44 D:\EnronProcessed\derrick-j\deleted_items\20.txt
796306 0.42 0.44 D:\EnronProcessed\derrick-j\sent_items\142.txt
957030 0.40 0.43 D:\EnronProcessed\mclaughlin-e\deleted_items\349.txt
957639 0.40 0.43 D:\EnronProcessed\mclaughlin-e\discussion_threads\764.txt
958371 0.40 0.43 D:\EnronProcessed\mclaughlin-e\notes_inbox\60.txt
1095054 0.40 0.43 D:\EnronProcessed\mclaughlin-e\private_folders\personal_stuff
796368 0.40 0.42 D:\EnronProcessed\derrick-j\sent_items\2.txt
796373 0.40 0.41 D:\EnronProcessed\derrick-j\sent_items\111.txt
761929 0.50 0.31 D:\EnronProcessed\campbell-l\discussion_threads\528.txt
763956 0.50 0.31 D:\EnronProcessed\campbell-l\notes_inbox\17.txt
796354 0.50 0.31 D:\EnronProcessed\derrick-j\sent_items\186.txt
795622 0.36 0.44 D:\EnronProcessed\derrick-j\deleted_items\3.txt
796301 0.36 0.43 D:\EnronProcessed\derrick-j\sent_items\137.txt Subject and Either Shingle or Winnow 796292 0.64 0.54 D:\EnronProcessed\derrick-j\sent_items\129.txt
796306 0.42 0.44 D:\EnronProcessed\derrick-j\sent_items\142.txt
796301 0.36 0.43 D:\EnronProcessed\derrick-j\sent_items\137.txt

COMPUTER-IMPLEMENTED SYSTEM AND METHOD FOR IDENTIFYING NEAR DUPLICATE DOCUMENTS

CROSS-REFERENCE TO RELATED APPLICATION

This non-provisional patent application claims priority under 35 U.S.C. §119(e) to U.S. Provisional Patent Application Ser. No. 61/701,538, filed Sep. 14, 2012, the disclosure of which is incorporated by reference.

FIELD

The invention relates in general to thread detection, and in particular, to a computer-implemented system and method for identifying near duplicate documents.

BACKGROUND

Document review is an activity frequently undertaken in the legal field during the discovery phase of litigation. Typically, document review requires reviewers to assess the relevance of documents to a particular topic as an initial step. Document reviews can be conducted manually by human reviewers, automatically by a machine, or by a combination of human reviewers and a machine. As the amount of documents to review increases, efficient methods of review are needed to reduce costs and time spent on review. Identification of duplicate and near duplicate documents can both reduce costs and time based on reducing the number of documents to review.

For instance, near duplicate documents can include emails having threads of text that can subsume earlier versions. Generally, the most recent reply is located at the top of the document, while the older replies are listed below the most recent reply. To prevent a user from reviewing each and every single email document in a thread, only the most recent email, which includes all the replies, need be reviewed. Alternatively, only original documents need to be reviewed.

Thus, there remains a need for a system and method for efficiently and effectively identifying duplicate and near duplicate documents to reduce costs and time spent reviewing documents.

SUMMARY

Two or more documents to be compared are each tokenized. The tokens for the documents are hashed and then compared. Based on a commonality of the hash codes in each document, duplicate and near-duplicate documents can be identified.

One embodiment provides a computer-implemented system and method for identifying near duplicate documents. A set of documents is obtained and each document is divided into segments. Each of the segments is hashed. A segment identification and sequence order is assigned to each of the hashed segments. The sequence order is based on an order in which the segments occur in the documents. The segments are compared based on the segment identifications and those documents with at least two matching segments are identified. The sequence orders of the matching segments are compared and based on the comparison, a determination is made that the identified documents share a relative sequence of the matching segments. The identified documents are designated as near duplicate documents.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 4 is a block diagram showing ordered hashes for three similar documents.

FIG. 5 is a block diagram showing ordered hashes for two similar documents.

FIG. 9 is a block diagram showing, by way of example, a set of shingles and hash codes for those shingles.

FIG. 10 is a screenshot of a user interface for displaying tuples associated with hashed tokens.

DETAILED DESCRIPTION

Identifying duplicate and near duplicate documents is important to prevent review of the same or similar documents and to reduce the amount of time and money spend on document review. Subject hashing can be used to determine duplicate or near duplicate documents. In subject hashing, the email subject line and the last N characters of the document's text are concatenated and used to produce a hash value. In one embodiment, the last ten characters are used. The documents are preprocessed to remove footers and signature blocks, as well as whitespace trimming. Once hashed, all of the documents are placed into a bucket. Each document within the bucket is compared with the others to find the longest document, which completely contains that document, by comparing word lists in reverse order.

However, subject hashing can be brittle and email specific. Hash code brittleness can cause the hashing algorithm to generate different hash codes for two versions of the same document when a single character change in a document's subject line or within the last few words of text is present. Since this algorithm relies on searching for identical hash codes for the various versions of the documents, this causes the algorithm to completely miss some cases where the documents are in fact similar. Content brittleness can cause generation of a false mismatch. For example, a document that includes a single edited word, such as a typo correction, will match backwards only up to that word. Also, emails typically contain reply text above the original. However, the reply can follow the original text. Another pattern for email reply is when the original email poses a list of some kind and the reply is interspersed within the text of the original. Finally, subject hashing can be limited only to emails, which have a document subject and typically follow the reply-above-the-original format. Documents that have no title or subject cannot be grouped by this method so it falls far short when it comes to handling document types other than email messages.

Figure 1:
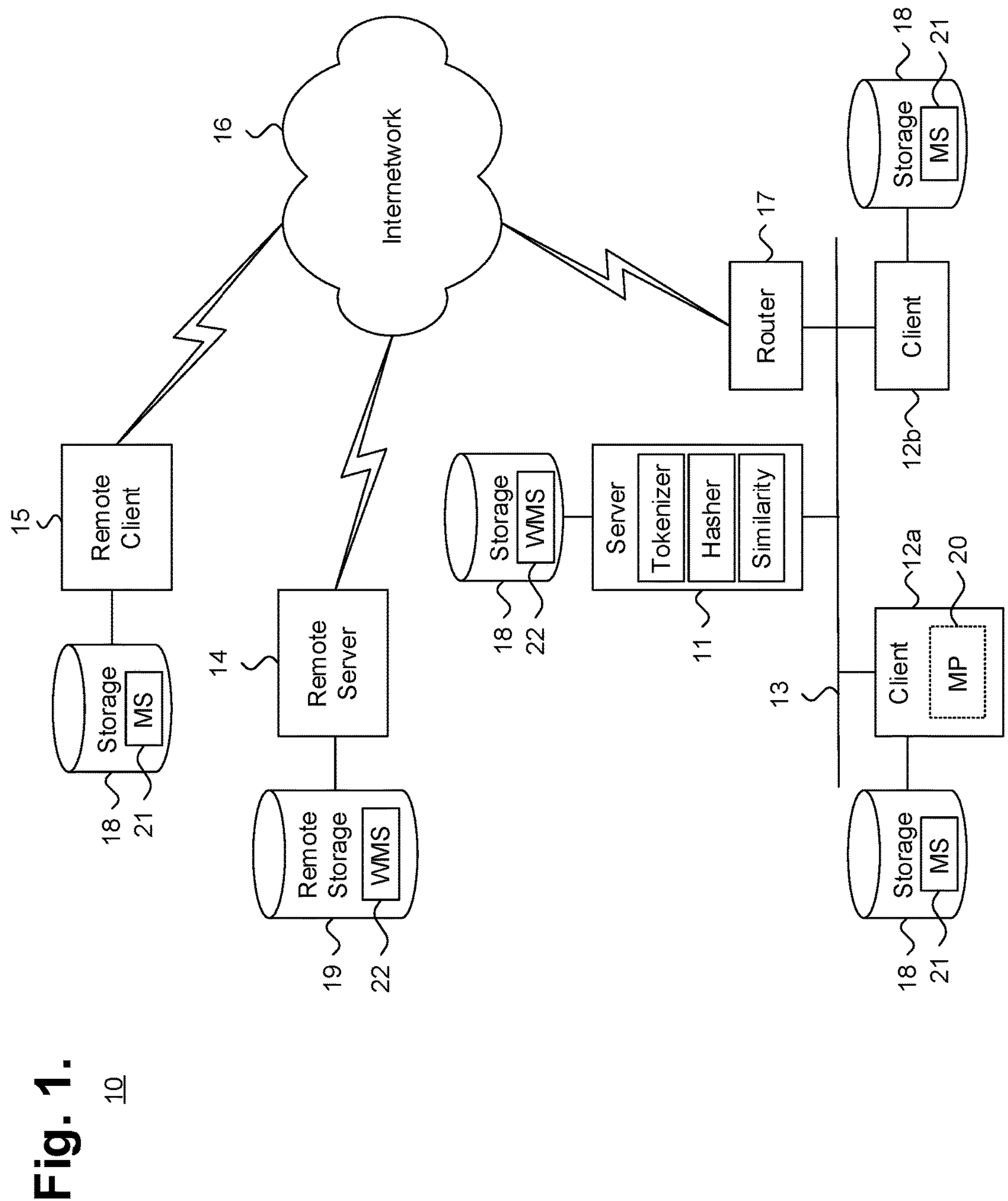
FIG. 1 is a block diagram showing a system for identifying duplicate and near duplicate documents, in accordance with one embodiment.

To effectively and efficiently locate duplicate and near duplicate documents, hashed token order, winnowing, or shingling can be used. Identifying duplicate and near duplicate documents requires a support environment to tokenize, hash, and determine similarities of documents. FIG. 1 is a block diagram showing a system for identifying duplicate and near duplicate documents, in accordance with one embodiment. The distributed computing environment 10 includes an internetwork 16, including the Internet, and an intranetwork 13. The internetwork 16 and intranetwork 13 are interconnected via a router 17 or similar interconnection device, as is known in the art. Other network topologies, configurations, and components are feasible, as would be recognized by one skilled in the art.

Electronic documents, particularly electronic mail (email), are exchanged between the various systems interconnected via the distributed computing environment 10. Throughout this document, the terms "document," "electronic message," and "message" are used interchangeably with the same intended meaning. In addition, message types encompass electronic mail, scheduling, tasking, contact management, project management, workgroup activities, multimedia content, and other forms of electronically communicable objects. These systems include a server 11 providing a message processing service to a plurality of clients 12*a*, 12*b* interconnected via the intranetwork 13. The server includes a tokenizer, hasher, and similarity measure. The tokenizer processes documents by generating tokens. The tokens can include terms, phrases, n-grams, sentences, paragraphs, pages, chapters, images, audio files, and video files, as well as other types of tokens. The hasher then assigns a hash code to each token and the similarity module applies a similarity measure to the hash codes to determine duplicate and near duplicate documents. The tokens, hash codes, and documents can be stored in a storage device interconnected to the server.

The clients 12*a*, 12*b* can also subscribe to a remote message processing service provided by a remote server 14 interconnected via the internetwork 16. Similarly, a remote client 15 can subscribe to either or both of the message processing services from the server 11 and the remote server 14 via the internetwork 16.

Each of the systems is coupled to a storage device. The server 11, clients 12*a*, 12*b*, and remote client 15 each maintain stored data in a local storage device 18. The remote server 14 maintains stored data in a local storage device (not shown) and can also maintain stored data for remote systems in a remote storage device 19, that is, a storage device situated remotely relative to the server 11, clients 12*a*, 12*b*, and remote client 15. The storage devices include conventional hard drives, removable and fixed media, CD ROM and DVD drives, and all other forms of volatile and non-volatile storage devices.

Each of the systems also maintains a message store, either on the local storage device or remote storage device, in which electronic messages are stored or archived. Each message store constitutes an identifiable repository within which electronic messages are kept and can include an integral or separate archive message store for off-line storage. Internally, each message store can contain one or more message folders (not shown) containing groups of related messages, such as an "Inbox" message folder for incoming messages, an "Outbox" message folder for outgoing messages, and the like. For clarity of discussion, individual message folders will be treated alike, although one skilled in the art would recognize that contextually related message folders might be separately processed.

In a workgroup-computing environment, the server 11 collectively maintains the message stores as a workgroup message store (WMS) 22 for each subscribing client 12*a*, 12*b* and remote client 15. In a distributed computing environment, each client 12*a*, 12*b* and remote client 15 might maintain an individual message store 21 either in lieu of or in addition to a workgroup message store 21. Similarly, the remote server 14 could maintain a workgroup message store 22 for remote clients.

The individual computer systems, including the server 11, remote servers and remote clients, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
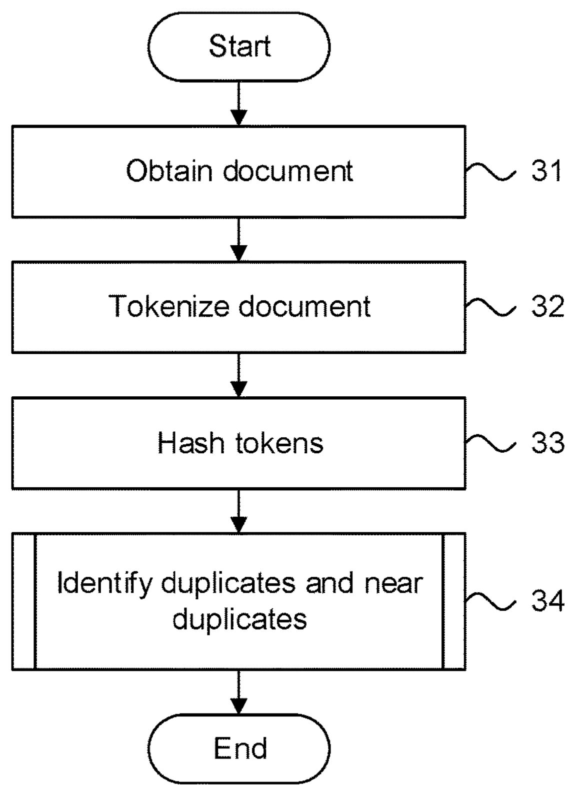
FIG. 2 is a flow diagram showing a method for identifying duplicate and near duplicate documents, in accordance with one embodiment.

Duplicate and near duplicate documents can be identified based on a hash code assigned to tokens within those documents. FIG. 2 is a flow diagram showing a method 30 for identifying duplicate and near duplicate documents, in accordance with one embodiment. One or more documents to be compared are obtained (block 31). The documents can include text documents, images, videos or audio files, and are processed to identify tokens (block 32), which are each hashed (block 33). The tokens can include terms, sentences, paragraphs, pages or chapters of a text document, or runs of pixels in an image, as well as other types of tokens. The hash codes can be non-cryptographic. In one embodiment, the hash algorithm is the MurmurHash. Those documents that are duplicates or near duplicates of each other are identified based on the hash (block 34). The duplicates and near duplicates can be identified based on an order of the hashes, shingling, or winnowing, which are described below with reference to FIGS. 3-9.

Figure 3:
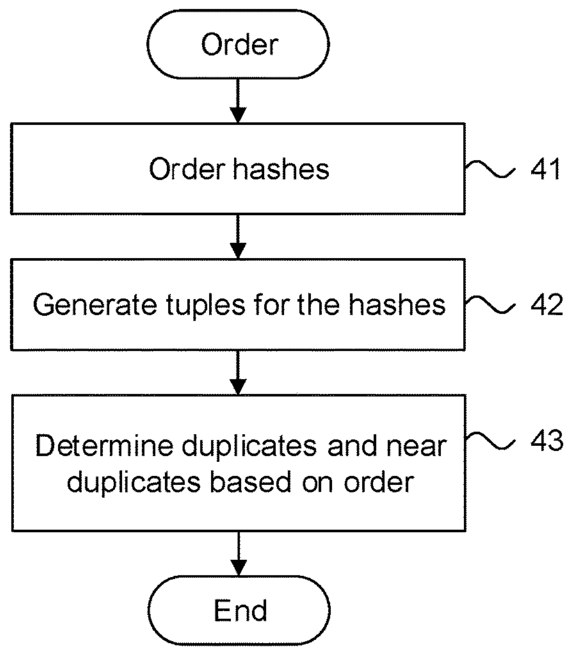
FIG. 3 is a flow diagram showing, by way of example, a process for identifying duplicate and near duplicate documents based on hash order.

Determining and comparing orders of tokens within a set of document can be used to determine those documents that are duplicates or near duplicates of each other. FIG. 3 is a flow diagram showing, by way of example, a process 40 for identifying duplicate and near duplicate documents based on hash order. As described above with reference to FIG. 2, a set of documents to be compared are tokenized and hashed. The hashed paragraphs are ordered (block 41) and tuples are generated (block 42) for each hash paragraph. Subsequently, duplicate and near duplicate documents are identified based on the hash codes and ordered tokens. The tuples can include a document identification, hash code, and sequence order. The document identification identifies the document to which the paragraph belongs, while the sequence order numbers the paragraphs in sequential order. The sequence helps provide measures of document similarity on a global level. For example, each time a document, such as an email reply is received, the counter renumbers the paragraphs of the document starting with zero. In one embodiment, the paragraphs are numbered from low to high, beginning with a most recent paragraph and ending with the oldest paragraph. However, other orders are possible.

Once generated, each tuple is stored into an index for identifying near duplicate documents, including those documents that contain other documents and those documents that are contained. Duplicate and near duplicate documents can be based on the hash codes and sequence order numbers. Meanwhile, a measure of similarity between the documents can be determined using shingling or winnowing, as discussed further below with reference to FIGS. 6 and 7, as well as cosine similarity, Jaccard similarity, and Spearman's Rho. Other similarity measures are possible.

Figures 4, 5:
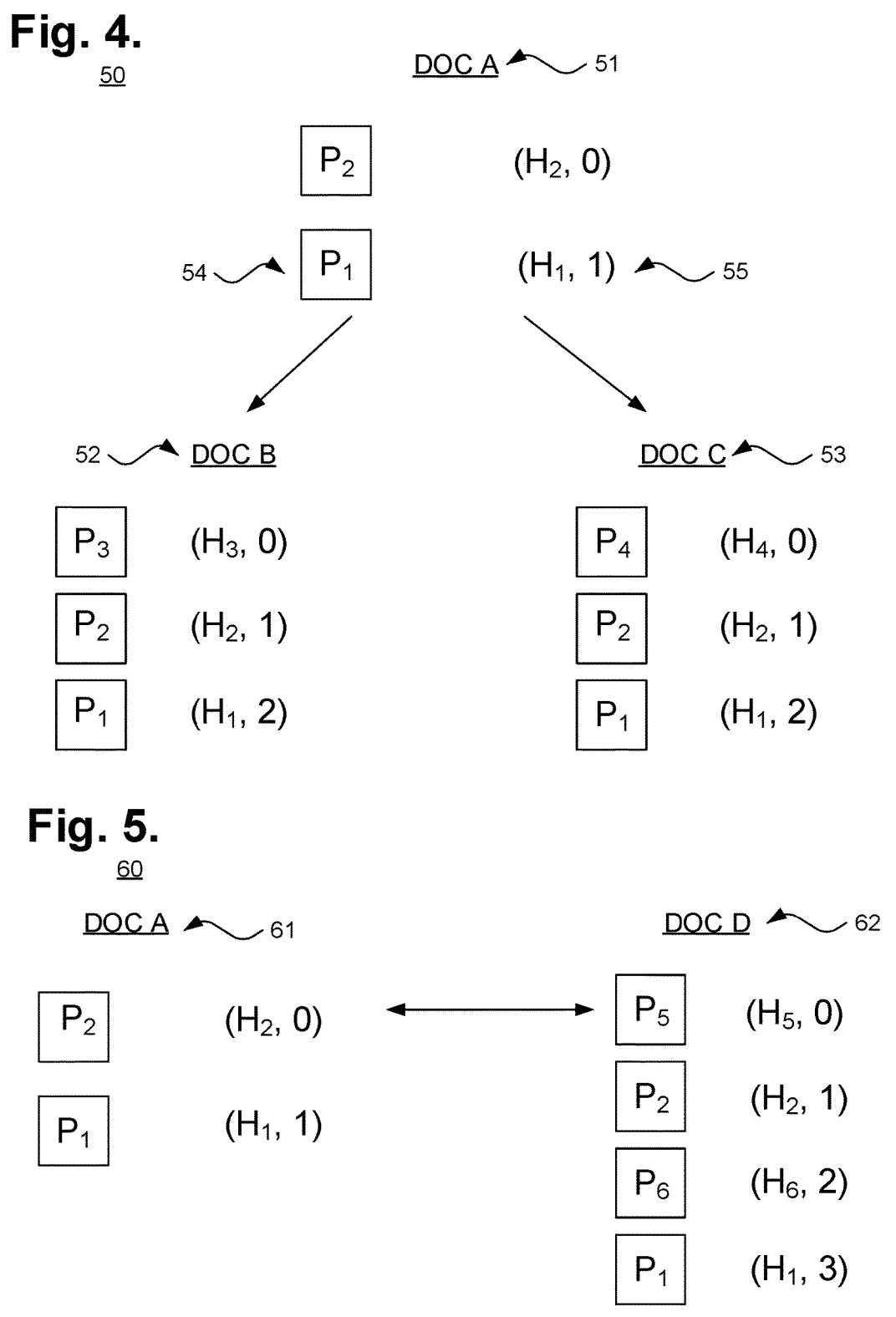

In one example, three documents to be compared are processed to generate tokens and each of the tokens is hashed. FIG. 4 is a block diagram 50 showing ordered hashes 55 for three documents 51-53. A first document, Document A 51, is processed to generate paragraph tokens. The document can be any text, audio, or visual file; however, in this example, the documents represent an email message at different points in a thread. Document A 51 includes two paragraphs 54, which are hashed. Meanwhile, both documents B 52 and C 53 have three paragraphs. Each hashed paragraph is associated with a tuple 55.

The hashed paragraphs of the three documents 51-53 are compared to identify which documents, if any, are duplicates or near duplicates of one another. Specifically, the order numbers of the hashed paragraphs are compared. For instance in Document A, paragraph 1 (P1) is associated with sequence order number 1, while paragraph 2 (P2) is associated with sequence order number 0, which indicates that P1 is the original paragraph and P2 was added subsequent to P1. In contrast, documents B and C each include three paragraphs. In document B, paragraph 3 (P3) is numbered zero, P2 is assigned sequence order number 1, and P1 is assigned sequence order number 2. In document C, paragraph 4 (P4) is assigned sequence order number zero, P2 is assigned sequence order number 1, and P1 is assigned sequence order number 2. The hash codes and sequence order numbers from the tuples are compared. Each of documents B and C share common paragraphs, P1 and P2 with document A. Additionally, the paragraphs are in the same order, with P1 occurring before P2. Thus, the content of document A is encompassed by each of documents B and C. Further, documents B and C differ only in the most recent paragraph. Document B has P3, while document C has P4, which indicates that the different responses may be provided to the same email of document A.

The original document can be identified as the document that includes the lowest count associated with a particular hash. For example, documents A, B, and C each include P1. The sequence order number for P1 is 1 in document A and 2 in documents B and C. Additionally, the original document of the three is document A since P1 has the lowest sequence order number in document A. In contrast, reply documents, such as documents B and C, have the same hash for common paragraphs, but a higher sequence order number than the original document.

Duplicate documents will have all the same hash codes in the same order with no other hash codes. In a further embodiment, duplicate documents will have the same hash code and both hashes will have a zero sequence order number. Near duplicate documents are identified as containing other documents or documents that are contained in other documents. For example, identifying documents that contain another document can be identified as those documents having hashes in common with the other document, but the sequences of the hash codes are greater than the sequences of the different document. Alternatively, documents that are contained can be identified as those documents that that include the same hash codes as another document, but have lower sequence order numbers than the hash codes in the other document.

In a further example, near duplicate documents can be identified even if one of the documents includes additional tokens that are inserted between the common tokens shared between the near duplicate documents. FIG. 5 is a block diagram showing ordered hashes for two documents. Document A 61 has two paragraphs. P1 is associated with hash code 1 and P2 is associated with hash code 2. Additionally, P2 is more recent in the document thread and is assigned sequence order number zero, while P1 is earlier in the thread and is assigned sequence order number 1. Document D 62 has four paragraphs, including paragraph 5 (P5) as the most recent paragraph, then P2, then paragraph 6 (P6), and P1 as the earliest paragraph in the document thread. P5 is assigned hash code 5 and sequence order number zero, while P2 is assigned hash code 2 and sequence order 1; P6 is assigned hash code 6 and sequence order number 2; and P1 is assigned hash code 1 and sequence order number 3. When compared, document D includes both paragraphs of document A in sequential order, even though P6 is inserted in between the two paragraphs. An example of inserting a paragraph between two existing paragraphs can be when a user replies to an email and inserts his reply underneath the existing text to which the reply pertains, rather than above the existing text. Additionally, P5 is the most recent paragraph and is likely a reply to the paragraph of document A. Generally, as long as the documents share a relative sequence of common hashes from lowest to highest, or vice versa, the documents are near duplicates of each other.

In one embodiment, a target document is selected. The target document can be the document in which a common hash shared with other documents has the lowest sequence order number. Once determined, the target document is compared to the other documents to determine those documents that are duplicates or near duplicates.

In a further embodiment, other metadata can be compared, including fields of a document, such as copy to, dates, to or from fields.

Shingling and winnowing, can be used to provide measures of similarity between two or more documents, which in turn can be used to determine duplicate or near duplicate documents. Shingling is a technique that also uses hashing to detect near duplicate runs of text. The text is broken into small sliding windows of length N words. The content of the window is then hashed, and the series of hash values is stored.

Figures 6, 7:
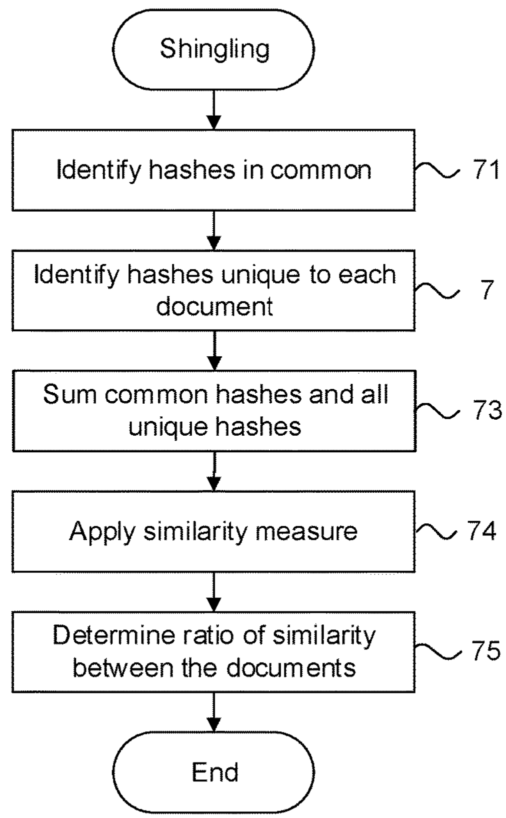
FIG. 6 is a flow diagram showing, by way of example, a process for shingling documents to identify duplicate and near duplicate documents.
FIG. 7 is a block diagram showing, by way of example, a set of shingles and hash codes for those shingles.

Documents that share large proportions of these hashes are easily detected via a similarity measure. FIG. 6 is a flow diagram showing, by way of example, a process for shingling documents to identify duplicate and near duplicate documents. The hashed tokens of the documents are compared to identify hashes that the documents share in common (block 71). Next, hashes that are unique to each document are identified (block 72). The common hashes and all unique hashes for each of the documents are summed (block 73) and a similarity measure is applied (block 74) to the number of hashes in common and the sum of hashes to determine a ratio of similarity between the documents (block 75). In one embodiment, the Jaccard similarity measure can be used. The Jaccard similarity measure is determined according to the equation below:

$$J(A, B) = \frac{|A \cup B|}{|A \cap B|} \quad \text{Eqn. 1}$$

The Jaccard similarity is equal to the intersection |A∪B| divided by the union |A∩B| of the hashes of documents A and B. In other words, count the hashes in common, and divide the number of common hashes by the sum of hashes present in the two documents to get the similarity measure. A perfect match will show that all of the hashes are shared by both of the documents, for a measure of 1.0. Two documents with no hashes in common will have a similarity of 0. By storing the document id and hash code pairs in an indexed table, a SQL query can be used to retrieve the similarity measure via a relatively simple self-join. This query allows a user to search for documents with a Jaccard Similarity measure above a chosen similarity threshold. In one embodiment the threshold value can be set to 0.2.

In one example, shingling can be used to identify documents as near similar, even though a typographical error was included in one of the documents. A first document, A, includes a misspelling and later a corrected copy, B, of the document is generated. Document A includes the following text: The quick brown fox jumped over the lazy red odg. Document B includes: The quick brown fox jumped over the lazy red dog. A three word overlapping shingle is used to tokenize the document. However, disjointed, or non-overlapping shingles can also be used. FIG. 7 is a block diagram showing, by way of example, a set of shingles 83 and hash codes 84 for those shingles. The shingles for document A 81 are listed in order of occurrence and associated with a hash code for that shingle. The shingles 83 for document B are also listed in order of occurrence and associated with their hash codes 84. The hash codes for the same shingles in documents A and B are compared. The first 7 shingles of the two documents, starting with "the quick brown" and ending with "the lazy red," are the same. Additionally, document A has three unique hashes and document B has three unique hashes, due to the misspelling of the term "dog." The majority of the hashes are not affected by the typographical error and in a larger document, the mismatches will be strongly outnumbered by the matches.

The hash counts are then used in the similarity measure, such as the Jaccard similarity. In this example, |A∪B|=7, which is a count of the shared hashes and |A∩B|=13, which is a count of all the unique hashes in common plus the hashes unique only to each of documents A and B, for a similarity measure of $\frac{7}{13}$=0.54.

Figure 8:
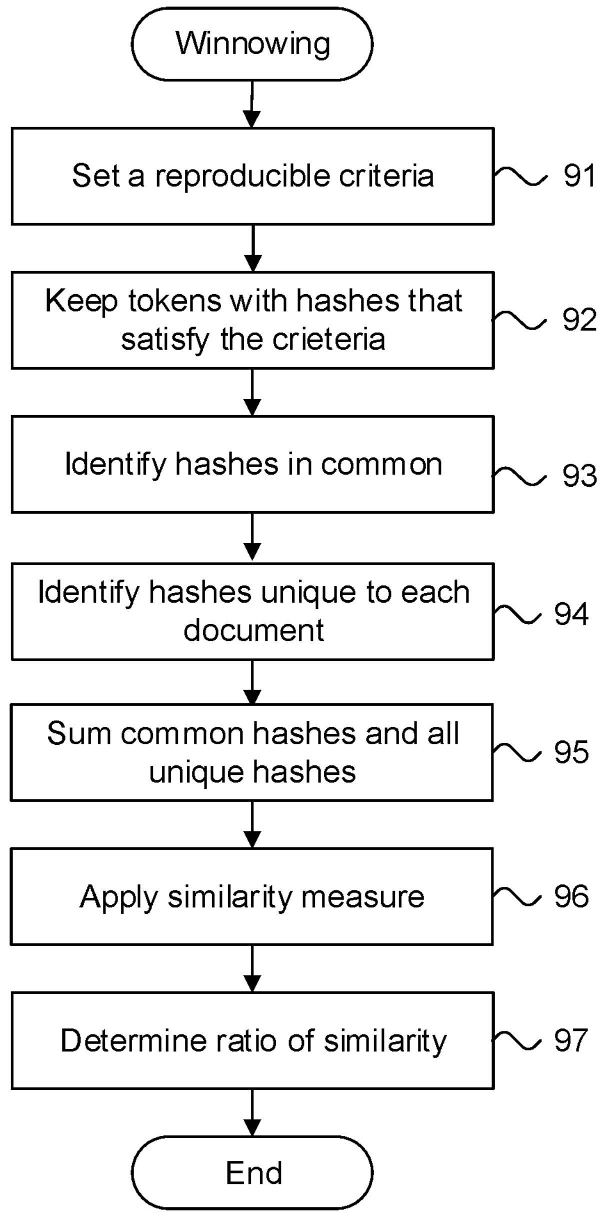
FIG. 8 is a flow diagram showing, by way of example, a process for winnowing documents to identify duplicate and near duplicate documents.

In a further embodiment, winnowing can be used to detect duplicate and near duplicate runs or threads of test. Like shingling, winnowing breaks the content into sliding windows, but a predictable portion of the shingles are ignored, lowering the data size requirements overall. This selection process can be deterministic, such that common text from two documents will have an equally high probability of being selected or ignored. FIG. 8 is a flow diagram showing, by way of example, a process 90 for winnowing documents to identify duplicate and near duplicate documents. One commonly used selection function is: H mod p=0, which only retains shingles where the shingle's hash value mod p is equal to 0. FIG. 9 is a block diagram showing, by way of example, a set of shingles and hash codes for those shingles. A selection function, such as H mod p=0 is applied to the set of hash codes. P=4 is used to retain approximately 1 of 4 of the shingles on average. Using the above text, and using p=4, one matching hash, 444444, and two non-matching hashes, A0A0A0 and 888888, which includes 1 hash in the intersection and 3 in the union, is used to determine a Jaccard similarity measure of 0.3333.

With both shingling and winnowing, a threshold of similarity can be set to determine whether documents are near duplicates. For instance the threshold can be set at 0.6 and all documents sharing a similarity of 0.6 or above with another document are determined to be near duplicates. In a further embodiment, duplicates will share a similarity of 1.0. Other values for determining near duplicates and duplicates are possible.

In one example, a predetermined email data set is processed to identify duplicate and near duplicate documents. The data set is pre-processed to remove headers, as well as other fields and material, such as footers and stop terms. An array of Background Worker classes is allocated and each class is set to operate on a subset of the document set in parallel. A main UI thread is free to process other work as required. Within each worker thread, the text file is read via a whitespace tokenizer that splits the text into a sequence of whitespace delimited tokens. The sequence is filtered by removing all words less than 5 characters long and by removing stop words. The list of tokens is then taken in overlapping seven word and five word windows of shingles. These shingles are hashed using MurmurHash v3, for example. Each tuple is bulk inserted into a new DocumentWinnowHash table in groups of 10000 hashes at a time.

The shingles can be displayed using the associated tuples. FIG. 10 is a screenshot of a user interface for displaying tuples associated with hashed tokens. There are seven list boxes presented on the display. The bottom left list box holds document identification numbers. Selecting one of the documents by identification number will then populate the five result list boxes with the documents that are calculated to match or relate to the selected document. The top middle list box holds documents that were identified only by the shingling algorithm. The center list box holds documents that were identified only by the winnowing algorithm. The bottom middle list box holds documents that are only identified by a subject hash algorithm, if determined. The top right list box holds documents that are identified by both shingling and winnowing algorithms. The bottom right list box holds items that were identified by subject hash and either shingling or winnowing.

The top left list box is a range selector that limits the number of items in the document identification list box, which is populated in groups of 1000 documents, for example. Selecting a document and populating the list boxes can take one to two seconds; however, other times are possible. Double clicking on one of the documents in any one of the results lists launches a Windiff-like text differencing utility that allows for side-by-side comparison of the base document (in the left pane) with the result document (in the right pane).

In a further embodiment, hashes of hashes can be generated based on shingling. For example, Hash 1 and Hash 2 can be combined to generate Hash 1,2, while Hash 2 and Hash 3 can be used to generate Hash 2,3. The hashes can be further hashed all the way down to a single hash for the document and if the single hash for the document matches another document, the two documents are duplicates of one another. If the hashes are not the same, a chart of the hashed hashes can be used to identify areas of each document that includes different text.

In yet a further embodiment, hash order, shingling and winnowing can all be applied to two or more documents to identify if the documents are duplicates or near duplicates.

In a further embodiment, metadata about the documents can be hashed and included with the content hash for comparison with other documents. For example, a first n number of hashes in a document are metadata hashes and content. The metadata and content hashes can be separately compared or compared together. In one embodiment, a multi-resolution hash of just the metadata can be generated. The comparison can determine whether documents have exact metadata but different content. For example, can find all documents from Joe to Barry since they have the same metadata fields "Joe" and "Barry" but the content of the document is different or some of the metadata is different even though the content is similar. Subsequently, the content of the documents can be compared to determine a similarity, such as by using cosine similarity, Jaccard similarity, and Spearman's Rho. Metadata can be included in the feature space. For example, a binomial distribution can be used for the metadata and a multi dimensional representation can be used for the content. Further a binomial distribution combination of the metadata and content can be used.

In a still further embodiment, the hashes can be used to perform clustering and classification of documents.

While the invention has been particularly shown and described as referenced to the embodiments thereof, those skilled in the art will understand that the foregoing and other changes in form and detail may be made therein without departing from the spirit and scope of the invention.

APPENDIX A

```
CREATE TABLE [DocumentWinnowHash] (
  [winnowhash] [int] NOT NULL,
  [main_id] [int] NOT NULL,
  [level] [int] NOT NULL,
  -[text] [nvarchar](100) NULL,   - optional for debugging
CONSTRAINT [PK_DocumentWinnowHash] PRIMARY KEY CLUSTERED
(
  [winnowhash] ASC,
  [main_id] ASC,
  [level] ASC
)WITH (PAD_INDEX   = OFF, STATISTICS_NORECOMPUTE = OFF, IGNORE_DUP_KEY = OFF,
ALLOW_ROW_LOCKS   = ON, ALLOW_PAGE_LOCKS   = ON) ON [PRIMARY]
) ON [PRIMARY]
GO
CREATE NONCLUSTERED INDEX [IX_DocumentWinnowHash_Docid_Hash_Level] ON
[dbo].[DocumentWinnowHash]
(
  [main_id] ASC,
  [winnowhash] ASC,
  [level] ASC
)WITH (PAD_INDEX   = OFF, STATISTICS_NORECOMPUTE   = OFF, SORT_IN_TEMPDB = OFF,
IGNORE_DUP_KEY = OFF, DROP_EXISTING = OFF, ONLINE = OFF, ALLOW_ROW_LOCKS   = ON,
ALLOW_PAGE_LOCKS   = ON) ON [PRIMARY]
GO
```

What is claimed is:

1. A computer-implemented system for identifying near duplicate documents, comprising:

a set of documents; and a server comprising memory and a central processing unit, wherein the central processing unit executes the following:

a tokenizer to divide each document into segments;

a hasher to hash each of the segments;

an assignment module to generate for each hashed segment in each document a tuple comprising a document identification for the document associated with the segment, a hash code, and a sequence order based on an order in which the segment occurs in that document;

a segment comparison module to compare the hashed segments of the documents;

a document designation module to designate as near duplicates, two or more of the documents each comprising a different number of hashed segments when a portion of the hashed segments for one of the designated documents matches hashed segments of the other designated documents and the matching hashed segments occur in a common sequential order; and an original document selection module to identify one of the near duplicate documents having one such matching segment with a lower sequence order than the other near duplicate documents and to select as an original document the identified near duplicate document having the matching segment with the lower sequence order than the other near duplicate documents.

2. A system according to claim 1, further comprising:

a document comparison module to compare an original document to the remaining documents in the set to identify those documents that are duplicates and near duplicates of the original document.

3. A system according to claim 2, further comprising:

a shingle module to divide each of the segments of the documents into sliding windows of N words;

a window hasher to hash each of the sliding windows;

a window comparison module to compare the hashed sliding windows for the original document with the hashed sliding windows for each of the remaining documents in the set; and a window similarity determination module to determine the similarity for each remaining document based on a number of the hashed sliding windows shared by the original document and that remaining document and based on a total number of the hashed sliding windows of the original document and that remaining document.

4. A system according to claim 3, further comprising:

a threshold module to apply a threshold to the similarity values assigned to the remaining documents; and the document designation module to designate the remaining documents with the similarity values that satisfy the threshold as near duplicates of the original document.

5. A system according to claim 1, further comprising:

a near duplicate similarity module to determine a similarity of the near duplicate documents.

6. A system according to claim 5, further comprising:

a shingle module to divide each of the segments of the documents into sliding windows of N words;

a window hasher to hash each of the sliding windows;

a window comparison module to compare the hashed sliding windows for the near duplicate documents; and a window similarity determination module to determine the similarity based on a number of the hashed sliding windows shared by the near duplicate documents and a total number of the hashed sliding windows of the near duplicate documents.

7. A system according to claim 1, further comprising:

a document clustering module to cluster the documents based on the hashed segments.

8. A system according to claim 1, wherein the sequence of the matching segments comprises a common sequential ordering of only the matching segments.

9. A system according to claim 1, further comprising:

a document relation module to determine that one of the near duplicate documents includes another of the near duplicate documents by determining that the matching segments of the near duplicate document are associated with higher sequence orders than the other near duplicate document.

10. A computer-implemented method for identifying near duplicate documents, comprising steps of:

obtaining a set of documents;

dividing each document into segments and hashing each of the segments;

generating for each hashed segment in each document tuples, each tuple comprising a document identification for the document associated with the segment, a hash code, and a sequence order based on an order in which the segment occurs in that document;

comparing the hashed segments of the documents; and designating as near duplicates, two or more of the documents each comprising a different number of hashed segments when a portion of the hashed segments for one of the designated documents matches hashed segments of the other designated documents and the matching hashed segments of the two or more documents occur in a common sequential order;

identifying one of the near duplicate documents having one such matching segment with a lower sequence order than the other near duplicate documents; and selecting as an original document the identified near duplicate document having the matching segment with the lower sequence order than the other near duplicate documents, wherein the steps are performed by a programmed computer.

11. A non-transitory computer readable storage medium storing code for executing on a computer system to perform the method according to claim 10.

12. A method according to claim 10, further comprising:

comparing an original document to the remaining documents in the set to identify those documents that are duplicates and near duplicates of the original document.

13. A method according to claim 12, further comprising:

breaking each of the segments of the documents into sliding windows of N words and hashing each of the sliding windows;

comparing the hashed sliding windows for the original document with the hashed sliding windows for each of the remaining documents in the set; and determining the similarity for each remaining document based on a number of the hashed sliding windows shared by the original document and that remaining document and based on a total number of the hashed sliding windows of the original document and that remaining document.

14. A method according to claim 13, further comprising:

applying a threshold to the similarity values assigned to the remaining documents; and designating the remaining documents with the similarity values that satisfy the threshold as near duplicates of the original document.

15. A method according to claim 10, further comprising:

determining a similarity of the near duplicate documents.

16. A method according to claim 15, further comprising:

breaking each of the segments of the documents into sliding windows of N words and hashing each of the sliding windows;

comparing the hashed sliding windows for the near duplicate documents; and determining the similarity based on a number of the hashed sliding windows shared by the near duplicate documents and a total number of the hashed sliding windows of the near duplicate documents.

17. A method according to claim 10, further comprising:

clustering the documents based on the hashed segments.

18. A method according to claim 10, wherein the sequence of the matching segments comprises a common sequential ordering of only the matching segments.

19. A method according to claim 10, further comprising:

determining that one of the near duplicate documents includes another of the near duplicate documents by determining that the matching segments of the near duplicate document are associated with higher sequence orders than the other near duplicate document.

* * * * *